United States Patent Office

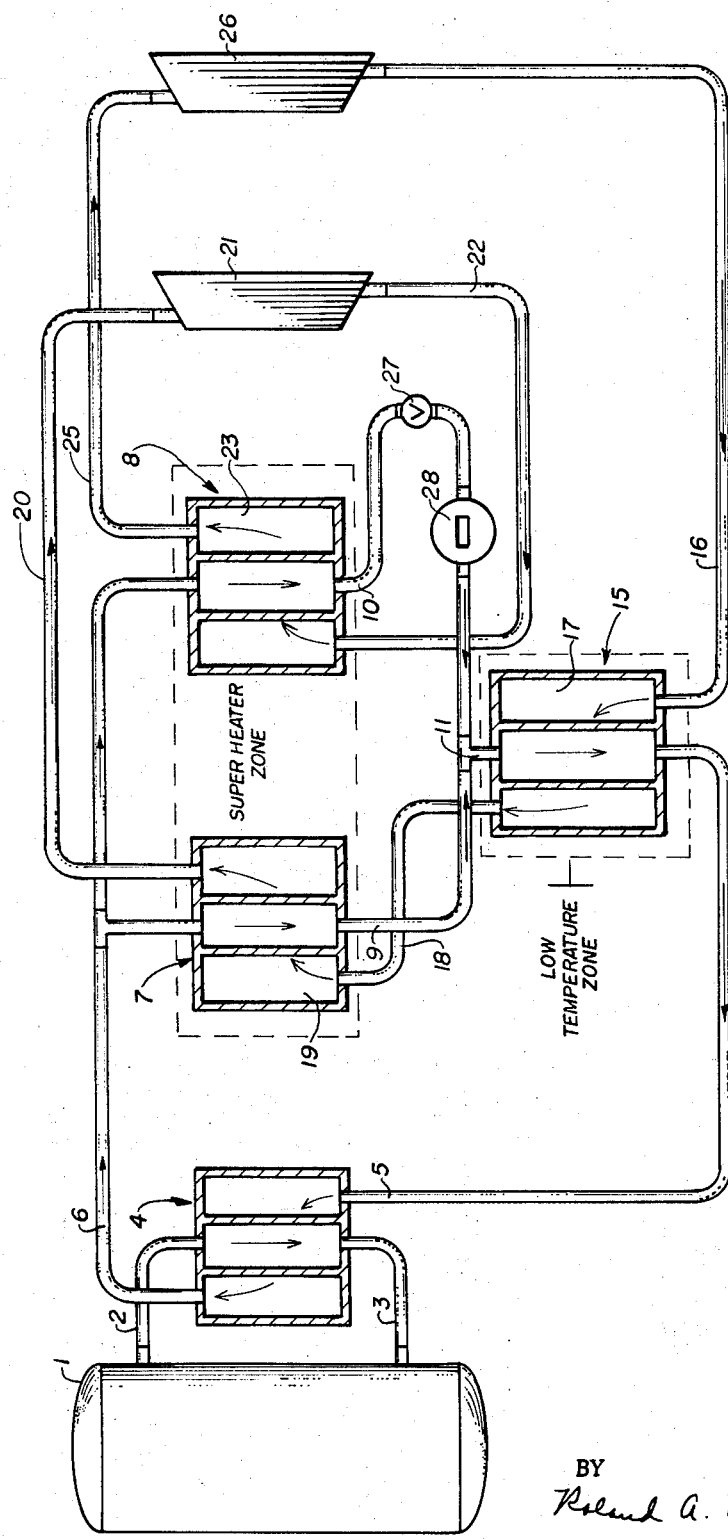
INVENTOR.
HAROLD C. PARRIS
BY Roland A. Anderson
ATTORNEY

3,374,149
Patented Mar. 19, 1968

3,374,149
NUCLEAR REACTOR HEAT TRANSFER SYSTEM
Harold C. Parris, Los Angeles, Calif., assignor to North American Aviation, Inc.
Filed May 19, 1967, Ser. No. 641,425
7 Claims. (Cl. 176—65)

ABSTRACT OF THE DISCLOSURE

A heat transfer system having a superheater, reheater and evaporator heat exchanging modules, each having a primary liquid metal flow path and a secondary fluid flow path. The primary fluid flow paths of the superheater and reheater modules are connected in parallel with each other and in series with the primary fluid flow path of the evaporator module. The secondary fluid flow paths of the superheater, evaporator and reheater modules are connected in series through a turbine.

Background of the invention

This invention relates to an improved heat transfer system in a nuclear reactor system. The invention described herein was made in the course of, or under, Contract No. AT(11-1)-GEN-8 with the U.S. Atomic Energy Commission.

In a nuclear reactor utilizing liquid metal coolant, the heat of the liquid metal is usually transferred to the rotating machinery by means of an intermediate heat exchanger (IHX) having a secondary sodium or other liquid metal system. The secondary sodium is passed through evaporator and superheater heat exchanging modules to generate steam. The steam rotates the turbine and the exhaust steam may be passed to a lower pressure turbine for further work, or may be reheated for a subsequent pass through a turbine.

The characteristics of such systems are not always obvious. Efficiency is of course of obvious importance. However, it is vastly more important that the characteristics of such systems be dictated not only by conventional heat transfer characteristics, but more importantly by the nuclear characteristics of the material and system. For example, when considering heat transfer from a liquid metal reactor coolant to water or steam, it is most important that radioactivity not be transferred to the water and that the materials should not deteriorate because of the liquid metal or radioactivity. It is also important that the temperature drop of the sodium and mixing of the sodium be adjusted to prevent future problems.

In addition to the required nuclear characteristics of material used in such heat transfer apparatus, the temperature and corrosive nature of the liquid metal also determines the material characteristics. In this regard, it is noted that materials having the best temperature characteristics do not always have the best heat transfer characteristics. In addition, the maximum allowable stress in a pipe decreases as the temperature increases.

Summary of the invention

Accordingly, it is an object of this invention to optimize the heat transfer characteristics of a liquid metal system.

It is another object to provide a heat transfer system for liquid metals which has satisfactory corrosion, allowable stress and nuclear characteristics, while yet obtaining maximum heat transfer.

A further object is to provide a heat transfer system having low cost reheater units, while not increasing the cost of the evaporator or superheater.

A still further object is to provide a heat transfer system which permits low temperature operation of the evaporator, thus permitting less costly ferritic materials which have a greater thermal conductivity while yet having sufficient maximum allowable stress at the low temperature.

Another object is to provide a system using ferritic materials in the evaporator, thereby utilizing the high corrosion resistance and high heat transfer characteristics of such material.

These objects are satisfied in this invention by passing the secondary liquid metal flow of the intermediate heat exchanger through the primary flow paths of both the superheater and reheater in parallel with each other and in series with the evaporator. This system thus provides a large temperature drop across the reheater and superheater in contrast with prior systems, so that a reduction in reheater size may be utilized. The resulting lower temperature drop across the evaporator permits use of ferritic material therein having high heat transfer capability.

These and other objects and advantages will be clarified by the following detailed description of the invention, in which:

The figure is a block diagram of the invention.

Description of preferred embodiment

In the figure, the bare essentials of the invention are shown for ease of understanding. It will be understood that in such a system there would be many other component parts such as pumps, expansion tanks, flow meters and cold traps, and flow regulating valves, etc., which are not shown.

A nuclear reactor 1 is shown having outgoing and incoming primary coolant lines 2 and 3 which contain a liquid metal such as liquid sodium. The heat generated within the reactor is transferred to a secondary sodium system in lines 5 and 6 by an intermediate heat exchanger 4 which may be of the shell and tube type.

Countercurrent flow within the heat exchangers is contemplated throughout this invention, i.e., the primary fluid flows in one direction in one tube or shell of the exchanger, while the secondary fluid flows in the opposite direction in an adjacent tube or shell. In the case of the intermediate heat exchanger 4, the primary hot fluid from the reactor is on line 2 flowing into the exchanger, while the secondary hot fluid is on line 6 flowing out of the exchanger as shown by the arrows. In the preferred example, the hot sodium on line 6 is approximately 1050° F.

The hot secondary fluid on line 6 flows in equal amounts through the parallel primary flow paths of two heat exchanger modules, namely the superheater module 7 and the reheater module 8. The output of the secondary liquid metal from these modules appears on lines 9 and 10 respectively, and flows into a common line 11 at the primary input of a third heat exchanger, namely the evaporator module 15. A flow regulating pump and valve is normally inserted in line 10 to control the sodium flow through the reheater. The primary output of the evaporator module 15 returns the secondary liquid metal fluid on line 5 to the intermediate heat exchanger at approximately 750° F. The total drop in sodium temperature is maintained at approximately 300–325° F.

Module type of heat exchangers are known, for example, in U.S. Patent 3,176,761, illustrating the shell and tube design. For convenience, we refer to the tubes as the primary flow path or system, while the shell is referred to as the secondary flow path or system.

The secondary flow systems for the evaporator 15, superheater 7 and reheater 8 will usually contain steam, although other fluids are also used, as for example mercury and organic fluids. For convenience in description, a steam system is described in the preferred example.

As a point of reference, water is, of course the starting fluid material in the secondary flow system of the evaporator, reheater and superheater. Normally, the water supply can be drawn from a river or other source, but here is shown on line 16 as the output from the low pressure turbine 26 or a condenser (not shown). The water is usually pumped through the secondary system 17 of the evaporator 15 and out on line 18 into the secondary system 19 of the superheater 7.

Steam on line 20 passes into the high pressure steam turbine 21 and exits on line 22 into the secondary flow path 23 of reheater 8. The steam on line 20 may be of the order of 1000° F. at approximately 2000 p.s.i.g.

Reheated steam passes out of the reheater on line 25 into the low pressure turbine 26 to return as feedwater on line 16. Low pressure steam on line 22 may be of the order of 500–700° F., and this is raidsed in the reheater to approximately 1000° F. for passage to the low pressure turbine 26.

It will be noted that countercurrent flow is indicated in all of the heat exchangers including the evaporator, reheater and superheater modules. While these elements are shown essentially in block diagram, it will be appreciated that each of these elements includes numerous essentially parallel or concentric tubes within a shell to permit countercurrent flow and heat transfer between the primary and secondary systems. The advantage of countercurrent flow is that it permits maximum heat transfer for any particular surface area.

The design of the system and its operation is fairly clear in contrast with the prior art. The system is adjusted so that the hot sodium on lines 9 and 10 is the same temperature, as a result of the substantially equal sodium flow through the superheater and reheater, and any additional regulation as may be necessary at any particular pressure.

The system is designed for a total sodium temperature drop of approximately 325° F. With a maximum sodium temperature of 1050° F. on line 6, the return sodium on line 5 is approximately 700–725° F.

Approximately half of the temperature drop occurs across the reheater and superheater because of their parallel connection. The other half of the sodium temperature drop occurs across the evaporator unit. A typical temperature on line 11 is 900° F.

Feedwater on line 16 may be at a temperature of approximately 500° F. and is raised to approximately 650° F. by passage through the evaporator. From the evaporator, this steam on line 18 is superheated to approximately 1000° F. Thus, the major temperature rise occurs in the superheater.

Similarly, the feedwater on line 22 into the reheater may be of the order of 550° F. and exits on line 25 at 900° to 1000° F. at approximately 400–600 p.s.i.

By connecting the reheater as shown, smaller reheaters can be used because of the large temperature drop of the sodium therein.

The evaporator operation is characterized by a low temperature drop with a high volume of sodium flow. The lower temperature drop would normally decrease the efficiency of a system. However, in this case, the temperature across the evaporator has been lowered to a level which permits the use of ferritic materials having a high heat transfer coefficient rather than one in which the allowable stress is all important. For example, stainless steel pipe with varying proportions of chromium and molybdenum are usually used for evaporator pipes. Above 700° F., the maximum allowable stress in tension for such pipes drops rapidly, depending upon the particular alloy, of course, from approximately 12,000 lb./in.$^2$ to as low as 5000 lb./in.$^2$ at 1000° F.

Thus by operating the evaporator at 700° F., the allowable stress in the pipe is sufficiently great that lower quality pipe may be used as evaporator tubes with greater heat transfer coefficient than heretofore in a liquid metal environment.

It usually follows that the addition of materials to steel which increases their high temperature utility, increases the maximum allowable stress at a particular temperature, but decreases their thermal conductivity and ability to withstand corrosion from the liquid metal.

Therefore, by operating the reheater and superheater modules in the high temperature zone and the evaporators in a low temperature zone, ordinary stainless steel with high thermal conductivity may be used in the evaporator, while stainless steel with a chromium content of the order of 5% is used in the superheater and reheater.

Having described a preferred embodiment of the invention, it will be obvious to those skilled in the art that modifications could be made thereto. Accordingly, the scope of this invention is to be limited only by the claims appended hereto.

I claim:

1. In a nuclear reactor system having a liquid metal output for extracting heat from the reactor and high temperature, reheater and evaporator heat exchanging modules for passing said liquid metal and for supplying superheated steam to high and low pressure turbines, the improvement comprising:

means including a connection of the liquid metal flow paths of the high temperature and reheater modules in parallel with each other and in series with the liquid metal flow-path of the evaporator for operating the high temperature and reheater modules in a high temperature region with a relatively large temperature drop whereby the evaporator operates with a low temperature drop in a low temperature region, said evaporator module including a heat transfer material of high thermal conductivity, said high temperature and reheater modules including a heat transfer material of lower thermal conductivity, and means for connecting the steam flow path in series through the evaporator to the high temperature heat exchanger, to the high pressure turbine to the reheater, and finally to the low pressure turbine and return of feedwater to the evaporator.

2. Apparatus for converting nuclear energy to mechanical or electrical energy using a turbine and at least two fluids including a liquid metal comprising:

a nuclear reactor, an intermediate heat exchanger connected for receiving a first liquid metal coolant from the reactor and for transferring heat to a second liquid metal, a high temperature superheating module, a reheater module, a low temperature module, each of said modules having primary and secondary flow-paths in heat transfer relationship, said low temperature module including material having a higher heat transfer coefficient than the material in said reheater and superheating modules, means for connecting the primary flow-paths of said superheating and reheater modules in parallel with each other and in series with the primary flow-path of said evaporator module for passing said second liquid metal, a third fluid, means for connecting the secondary fluid paths of said evaporator and superheating modules in series with said third fluid for rotating a high pressure turbine, means for connecting the secondary fluid path of said reheater for receiving exhaust fluid from the high pressure turbine for rotating a low pressure turbine.

3. Apparatus as in claim 2, including means for controlling the temperature of the secondary liquid metal at the junction of said superheater, reheater and evaporator modules for providing a smaller temperature drop across the evaporator module than across the reheater and superheater modules.

4. Apparatus as in claim 3, including valve and flow regulating means connected between the reheater and evaporator modules in the primary flow path.

5. Apparatus as in claim 4, wherein the flow of fluids through the modules is countercurrent.

6. Apparatus as in claim 5, wherein the liquid metal consists of sodium.

7. Apparatus as in claim 6, wherein the sodium at the entrance to the superheating and reheating modules has a temperature of approximately 1050° F., and wherein the temperature drop of said sodium, in flowing through the superheater and evaporator, is approximately 300° F.

References Cited

Directory of Nuclear Reactors, vol. I, Power Reactors, June 1959, TK–9202–I5, International Atomic Energy Agency, pp. 189, 195, 201, 207, 213.

REUBEN EPSTEIN, *Primary Examiner.*